United States Patent
Ono et al.

(10) Patent No.: US 6,255,898 B1
(45) Date of Patent: Jul. 3, 2001

(54) NOISE ELIMINATING CIRCUIT

(75) Inventors: Akihiko Ono; Takumi Kawai, both of Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/598,919

(22) Filed: Jun. 22, 2000

(30) Foreign Application Priority Data

Sep. 17, 1999 (JP) .................................................. 11-263674

(51) Int. Cl.[7] .................................................. H03K 5/00
(52) U.S. Cl. .................................. 327/551; 327/63; 360/65
(58) Field of Search .................................... 327/551, 552, 327/58, 62, 63, 331, 306, 308, 310; 360/46, 64

(56) References Cited

U.S. PATENT DOCUMENTS 5,418,660 * 5/1995 Sato et al. .............................. 360/65
5,801,896 * 9/1998 Freitas .................................... 360/51
6,151,400 * 11/2000 Seligman ............................. 381/317

* cited by examiner

Primary Examiner—Dinh T. Le
(74) Attorney, Agent, or Firm—Arent Fox Kintner Plotkin & Kahn, PLLC

(57) ABSTRACT

A noise eliminating circuit eliminates thermal asperity noise in a reproduction signal generated by a magnetic read head in a disk drive. The noise eliminating circuit includes a differential amplifier that receives the reproduction signal and a feedback signal and generates an amplified signal. A detection circuit connected to the differential amplifier detects noise in the amplified signal and generates a control signal. The control signal is activated when the noise is detected. A feedback circuit connected to the differential amplifier and the detection circuit cuts off the amplified signal with a first cutoff frequency when the control signal is not active and cuts off the amplified signal with a second cutoff frequency when the control signal is active.

13 Claims, 6 Drawing Sheets

NOISE ELIMINATING CIRCUIT

BACKGROUND OF THE INVENTION

The present invention relates to a noise eliminating circuit, and more particularly, to a noise eliminating circuit for eliminating noise (i.e., thermal asperity) in an amplification circuit that is produced when a magneto resistive (MR) head contacts a hard disk, which amplifies reproduction signals of the hard disk.

In a conventional hard disk device, heat is produced when an MR head contacts a hard disk while reading data. This increases the resistance of the MR head and results in a reproduction signal ST that includes low frequency noise, which is referred to as thermal asperity (TA), as shown in FIG. 1.

FIG. 2 is a schematic block diagram showing a first prior art thermal asperity compensating circuit 81, which eliminates thermal asperity. The compensating circuit 81, which is connected between a first read amplifier 82 and a second read amplifier 83, includes a capacitor C, a resistor R, and a switch SW. The compensating circuit 81 functions as a bypass filter. When thermal asperity is detected, the switch SW is activated and the compensating circuit 81 eliminates the thermal asperity.

FIG. 3 is a schematic block diagram showing a second prior art thermal asperity compensating circuit 84. The compensating circuit 84 is connected between a first read amplifier 82 and a second read amplifier 83 and includes a delay circuit 85, an envelope waveform generating circuit 86, a low-pass filter 87, and an operational amplifier circuit 88.

An amplified reproduction signal generated by the first read amplifier 82 is delayed by the delay circuit 85 and then provided to the operational amplifier circuit 88. The amplified reproduction signal is also provided to the operational amplifier circuit 88 via the envelope waveform generating circuit 86 and the low-pass filter 87.

When thermal asperity is included in the amplified reproduction signal output by the first read amplifier 82, the thermal asperity component is provided to the operational amplifier circuit 88 via the envelope waveform generating circuit 86 and the low-pass filter 87. The operational amplifier circuit 88 detects this noise and then removes the thermal asperity component from the amplified reproduction signal provided by the delay circuit 85 and generates an amplified reproduction signal from which the thermal asperity is eliminated.

The first read amplifiers 82 located upstream of the thermal asperity compensating circuits 81, 84 also amplify the thermal asperity component. Accordingly, the first read amplifier 82 may be saturated by the thermal asperity component. A circuit for preventing saturation may be provided in the first read amplifier 82. This would, however, complicate the circuit configuration of the first read amplifier 82. Further, after eliminating thermal asperity, a relatively long time would be necessary to terminate the saturated state. In other words, a certain length of time would be necessary for the first read amplifier 82 to start functioning normally again.

SUMMARY OF THE INVENTION

It is an object of the present invention to provide a noise eliminating circuit that eliminates noise components without saturating the amplification circuit when noise is produced.

To achieve the above object, the present invention provides a noise eliminating circuit for eliminating noise from an input signal. The noise eliminating circuit includes a differential amplifier for receiving the input signal and a feedback signal and generating a differential amplified signal. A detection circuit is connected to the differential amplifier for detecting noise included in the differential amplified signal and generating a control signal. The control signal is activated when the noise is detected. A feedback circuit is connected to the differential amplifier and the detection circuit for cutting off the differential amplified signal in accordance with a first cutoff frequency when the control signal is deactivated, and cutting off the differential amplified signal in accordance with a second cutoff frequency, which includes the frequency of the noise, when the control signal is activated.

Another aspect of the present invention provides an amplification circuit for amplifying a reproduction signal read from a magnetic recording medium using a magneto resistive head. The amplification circuit includes a differential amplifier for receiving the reproduction signal and a feedback signal and generating a differential amplified signal. A detection circuit is connected to the differential amplifier for detecting thermal asperity noise included in the differential amplified signal and generating a control signal. The control signal is activated when the noise is detected. A feedback circuit is connected to the differential amplifier and the detection circuit for cutting off the differential amplified signal in accordance with a first cutoff frequency when the control signal is deactivated, and cutting off the differential amplified signal in accordance with a second cutoff frequency, which includes the frequency of the thermal asperity noise, when the control signal is activated.

A further aspect of the present invention provides a magnetic recording device including a magneto resistive head for generating a reproduction signal in accordance with polarity changes of a magnetic recording medium, and an amplification circuit connected to the magneto resistive head for amplifying the reproduction signal. The amplification circuit includes a differential amplifier for receiving the reproduction signal and a feedback signal and generating a differential amplified signal. A detection circuit is connected to the differential amplifier for detecting thermal asperity noise included in the differential amplified signal and generating a control signal. The control signal is activated when the noise is detected. A feedback circuit is connected to the differential amplifier and the detection circuit for cutting off the differential amplified signal in accordance with a first cutoff frequency when the control signal is deactivated, and cutting off the differential amplified signal in accordance with a second cutoff frequency, which includes the frequency of the thermal asperity noise, when the control signal is activated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
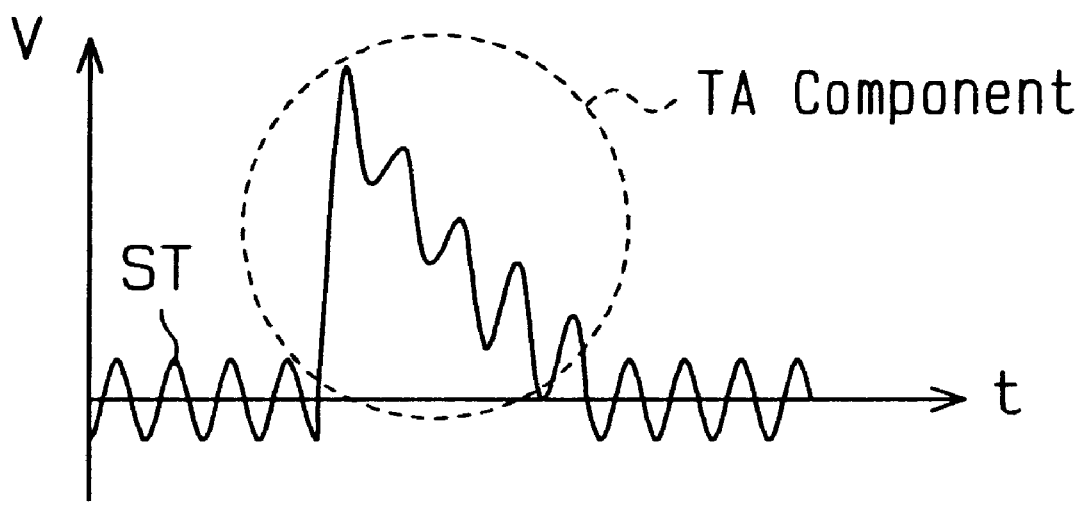
FIG. 1 is a graph showing the waveform of a reproduction signal including thermal asperity.
Figure 2:
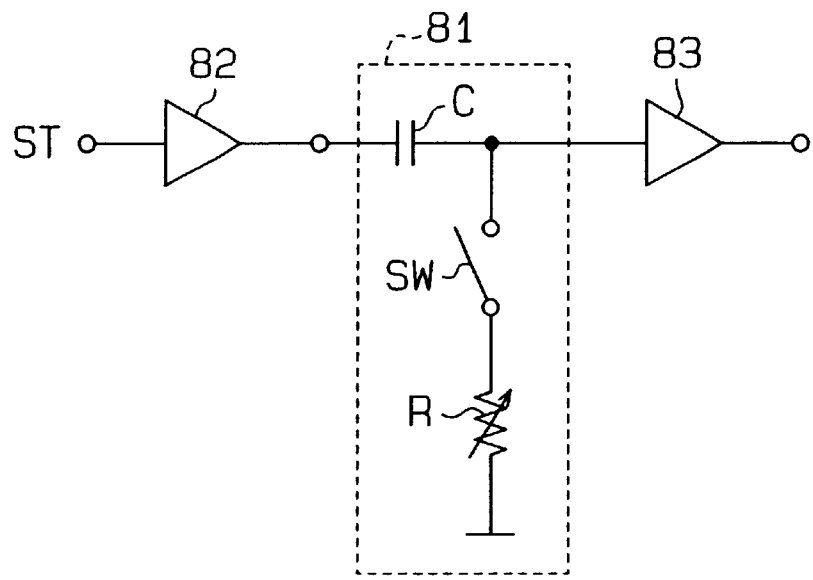
FIG. 2 is a schematic block diagram showing a first prior art reproduction amplifier.
Figure 3:
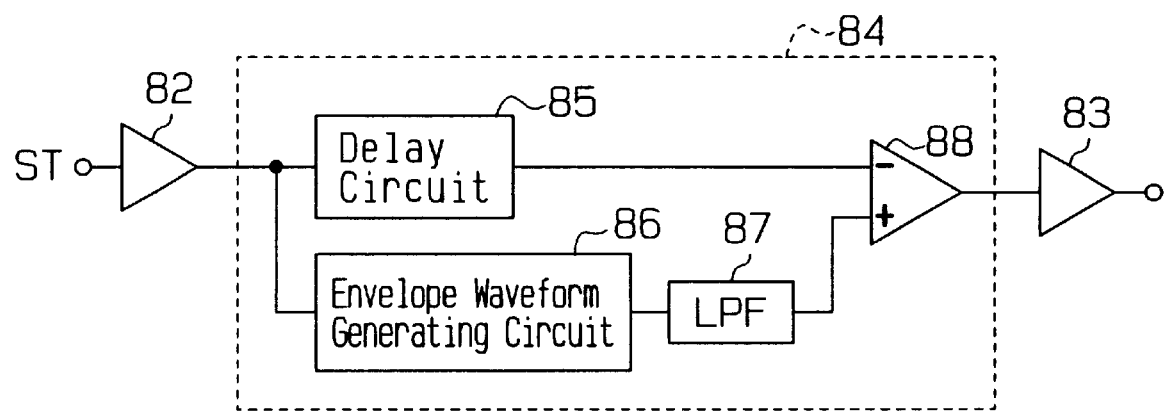
FIG. 3 is a schematic block diagram showing a second prior art reproduction amplifier.
Figure 4:
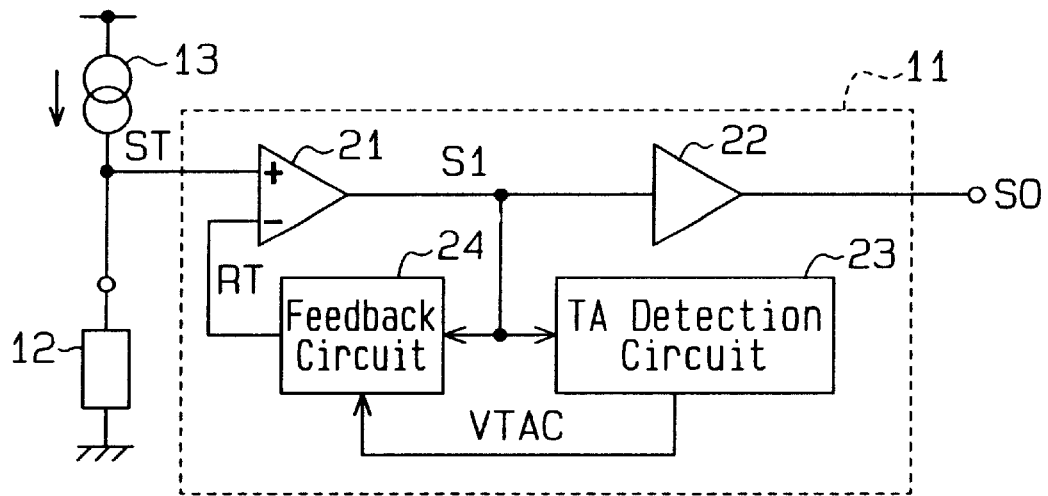
FIG. 4 is a schematic block diagram showing a reproduction amplifier according to a first embodiment of the present invention.

FIG. 4 is a schematic block diagram showing a reproduction amplifier 11 of a magnetic recording apparatus (magnetic disk apparatus). The reproduction amplifier 11 is connected to a magnetic resistance (MR) head 12. A constant-current supply 13 provides the MR head 12 with constant current. The MR head 12 generates a reproduction signal ST having a waveform corresponding to the polarity changes of a magnetic disk (not shown).

The reproduction amplifier 11 amplifies the reproduction signal ST provided by the MR head 12 and generates an amplified reproduction signal SO. The reproduction amplifier 11 detects the thermal asperity component included in the reproduction signal ST to generate the amplified reproduction signal SO from which the thermal asperity component is eliminated.

The reproduction amplifier 11 includes a first amplifier 21, a second amplifier 22, a thermal asperity (TA) detection circuit 23, and a feedback circuit 24.

The first amplifier 21, which preferably is a differential amplifier, has a non-inverting input terminal for receiving the reproduction signal ST and an inverting input terminal for receiving a feedback signal RT from the feedback circuit 24. The first amplifier 21 amplifies the difference between the reproduction signal ST and the feedback signal RT in accordance with a predetermined gain and provides a differential amplified signal Sl to the second amplifier 22.

The second amplifier 22 amplifies the differential amplified signal S1 to generate the amplified reproduction signal SO. The total gain of the first and second amplifiers 21, 22 (i.e., the gain of the reproduction amplifier 11) is preset so that the amplitude of the amplified reproduction signal SO is optimal for a signal processing circuit (read channel LSI) to perform a decoding process. It is preferred that the total gain corresponds to an amplifying rate of 100 to 200 times.

Figure 5A:
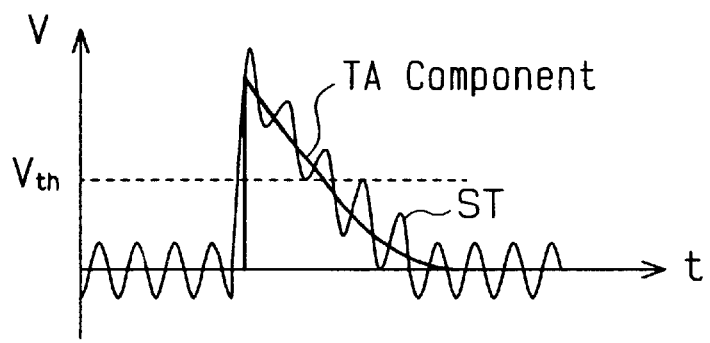
FIG. 5(a) is a graph showing the waveform of a reproduction signal including thermal asperity.

With reference to FIG. 5(a), the TA detection circuit 23 detects the TA component included in the reproduction signal ST and generates a control signal VTAC. The control signal VTAC is provided to the feedback circuit 24. More specifically, the TA detection circuit 23 generates a positive peak envelope signal of the differential signal S1 from the first amplifier 21 and a negative peak envelope signal of an inverted signal of the differential amplified signal S1. Then, the TA detection circuit 23 computes a difference $\Delta EV$ between the two peak envelope signals. The period during which the difference $\Delta EV$ is positive ($\Delta EV>0$), or the period during which the positive peak envelope signal is greater than the negative peak envelope signal, is recognized as a TA compensation period by the TA detection circuit 23. During the TA compensation period, the TA detection circuit 23 causes the control signal VTAC to go high. This facilitates and ensures the detection of the thermal asperity component without having to determine a threshold value for detecting the thermal asperity component or a DC offset amount of the differential amplified signal S1.

In response to the control signal VTAC from the TA detection circuit 23, the feedback circuit 24 switches between a first cutoff frequency fc1 and a second cutoff frequency fc2. The feedback circuit 24 then restricts the band of the differential amplified signal S1 from the first amplifier 21 in accordance with the switched cutoff frequency and generates the feedback signal RT.

More specifically, the feedback circuit 24 switches to the first cutoff frequency fc1 when the control signal VTAC goes low and switches to the second cutoff frequency fc2 when the control signal VTAC goes high. The first cutoff frequency fc1 is preset so that it is lower than a low frequency range BWL (about 1 MHz) of the reproduction signal frequency band (approximately LMHZ to several hundred MHZ). This causes the feedback circuit 24 to cut off signal components having a frequency band of approximately 1 MHz or higher from the differential amplified signal S1 when generating the feedback signal RT.

The second cutoff frequency fc2 is preset in accordance with the frequency of the thermal asperity component so that the feedback signal RT is set to have a band ranging from DC (direct current component) to the thermal asperity frequency (approximately 1 MHz).

In the feedback signal RT provided to the inverting input terminal (reference input terminal) of the first amplifier 21, the reproduction signal frequency band is excluded and the DC component is included. This cancels the DC offset produced by the first amplifier 21 and generates the differential amplified signal S1 from which the DC offset is cancelled. That is, the reproduction amplifier 11 generates the amplified reproduction signal S0 in which the DC offset produced by the first amplifier 21 is compensated for.

Figure 5B:
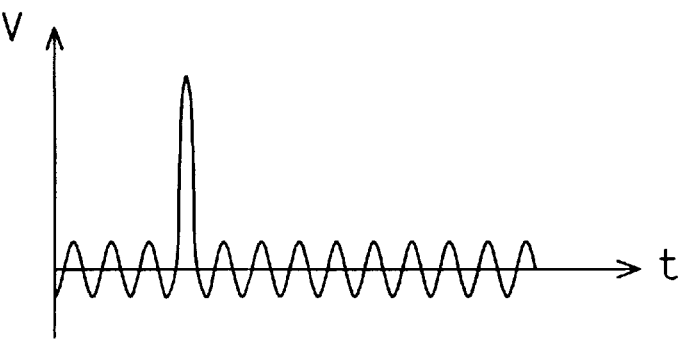
FIG. 5(b) is a graph showing the waveform of the reproduction signal from which thermal asperity has been eliminated.

When thermal asperity occurs, the inverting input terminal of the first amplifier 21 is provided with the feedback signal RT, which has a band ranging from DC to the thermal asperity component, in the same phase as the reproduction signal ST. The first amplifier 21 amplifies the difference between the feedback signal RT and the reproduction signal ST to generate the differential amplified signal S1. As shown in FIG. 5(b), this generates the differential amplified signal S1 in which the frequency band ranging from the DC component to the thermal asperity component is cancelled from the reproduction signal ST. In other words, the reproduction amplifier 11 compensates for the thermal asperity that occurs at the MR head 12 and the DC offset produced by the first amplifier 21 to generate the amplified reproduction signal SO.

The TA detection circuit 23 and the feedback circuit 24 will now be discussed in detail.

Figure 6:
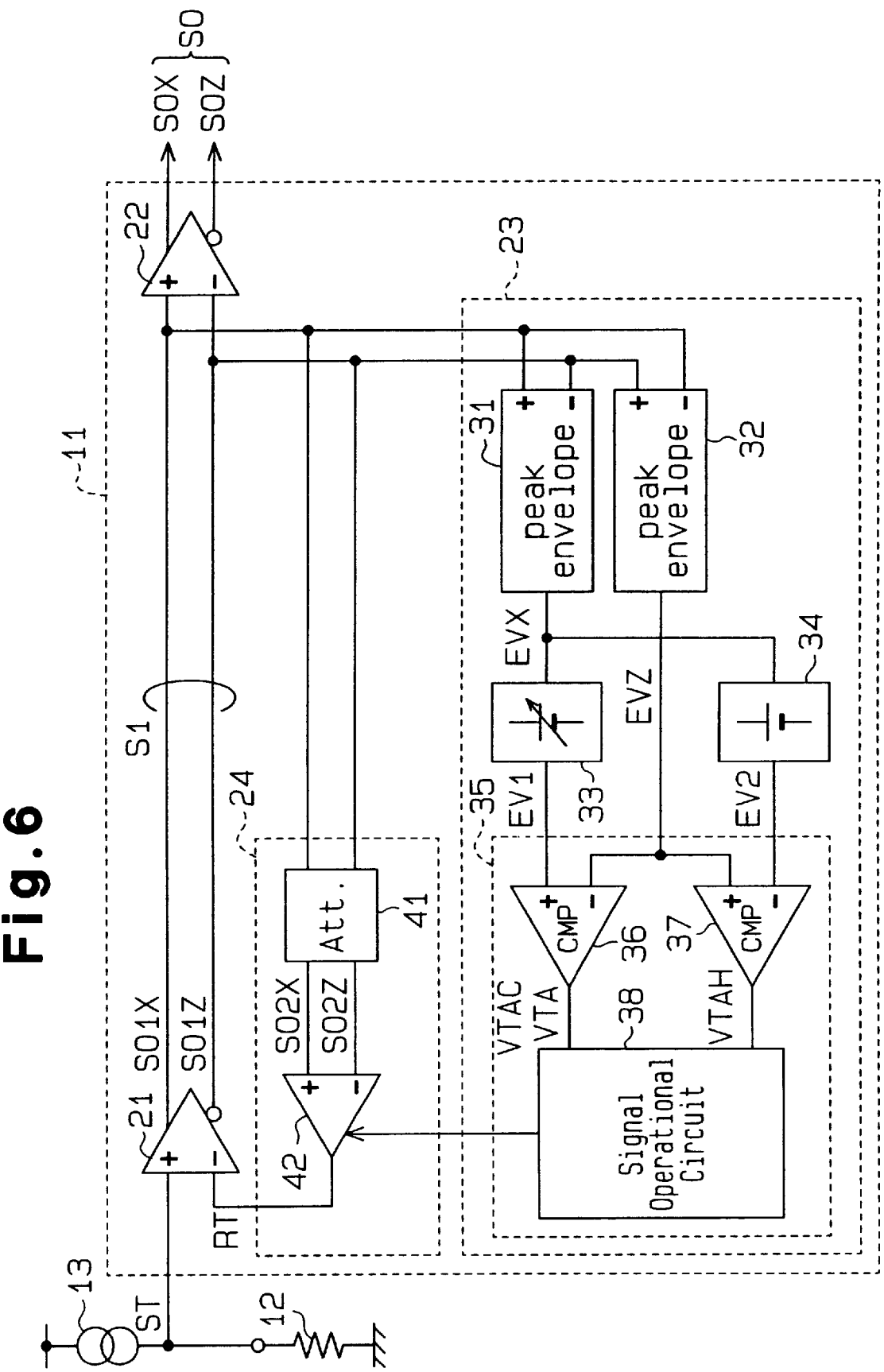
FIG. 6 is a more detailed schematic block diagram showing the reproduction amplifier of FIG. 4.

FIG. 6 is a more detailed schematic block diagram showing the reproduction amplifier 11.

The first amplifier 21 amplifies the reproduction signal ST to generate the differential amplified signal S1 (signal SO1X and inverted signal SO1Z). The second amplifier 22 amplifies the signal SO1X provided to its non-inverting input terminal and the inverted signal SO1Z provided to its inverting input terminal to generate the amplified reproduction signal SO (signal SOX and inverted signal SOZ).

The TA detection circuit 23 includes first and second peak envelope waveform generating circuits 31, 32, first and second offset circuits 33, 34, and a signal generating circuit 35.

Figure 7A:
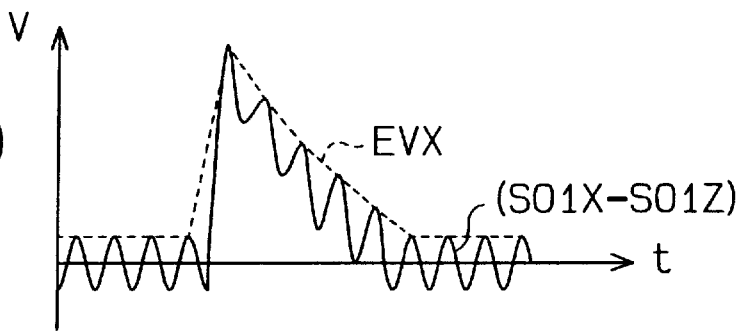
FIGS. 7(a) and 7(b) are graphs each showing an envelope signal.

The first waveform generating circuit 31 uses the signal SOX, which is provided to its non-inverting input terminal, and the inverted signal SO1Z, which is provided to its inverting input terminal, to generate a positive peak envelope signal EVX, which is based on the peak of a signal (SO1X–SO1Z) shown in FIG. 7(a).

Figure 7B:
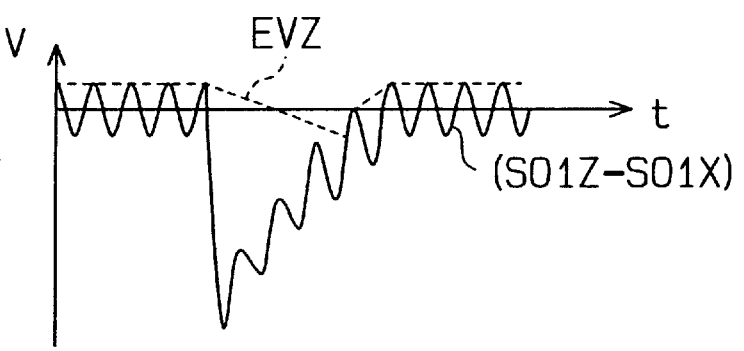

The second waveform generating circuit 32 uses the inverted signal SO1Z, which is provided to its non-inverting input terminal, and the signal SO1X, which is provided to its inverting input terminal, to generate a negative peak envelope signal EVZ, which is based on the peak of a signal (SO1Z–SO1X) shown in FIG. 7(b).

The first and second offset circuits 33, 34 receive the positive peak envelope signal EVX from the first waveform generating circuit 31 and offset the envelope signal EVX by a predetermined amount to generate first and second offset signals EV1, EV2, respectively. More specifically, the first offset circuit 33 adds a first negative offset voltage −V1 to the envelope signal EVX to generate the first offset signal EV1. The second offset circuit 34 adds a second negative offset voltage −V2 to the envelope signal EVX to generate the second offset signal EV2. The first and second offset voltages −V1, −V2 are set in accordance with the level of the thermal asperity and facilitate the generation of the control signal VTAC by the signal generating circuit 35.

Figure 8:
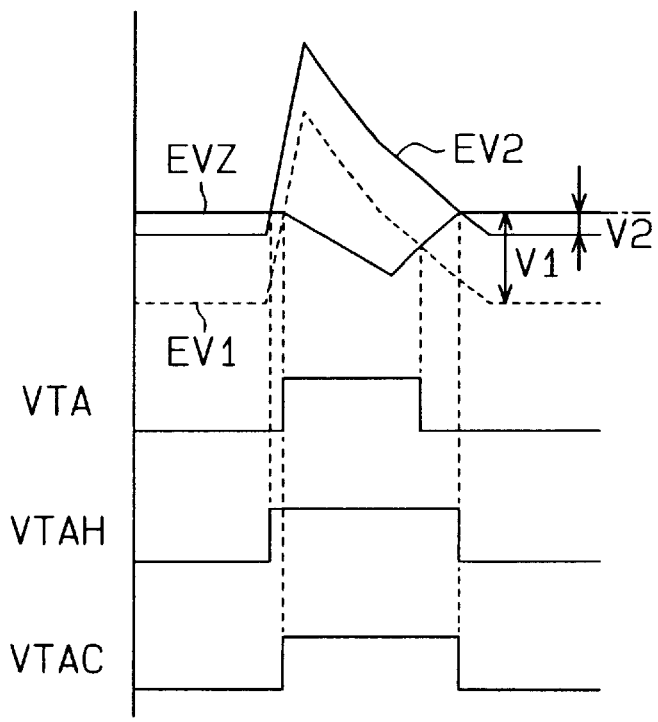
FIG. 8 is a graph showing the signal of the reproduction amplifier of FIG. 6.

The signal generating circuit 35 includes first and second comparators 36, 37 and a signal operational circuit 38. The first comparator 36 compares the first offset signal EV1, which is received by its non-inverting input terminal, and the negative peak envelope signal EVZ, which is received by its inverting input terminal, and generates a TA detection signal VTA. More specifically, referring to FIG. 8, the first comparator 36 causes the TA detection signal VTA to go high when the first offset signal EV1 is higher than the negative peak envelope signal EVZ and causes the TA detection signal VTA to go low when the first offset signal EV1 is lower than the negative peak envelope signal EVZ. When the TA detection signal VTA is high, thermal asperity is equal to or greater than a predetermined level. In other words, the first offset voltage −V is set in accordance with the detection level of the thermal asperity.

The second comparator 37 compares the second offset signal EV2, which is received by its inverting input terminal, and the negative peak envelope signal EVZ, which is received by its non-inverting input terminal, to generate a TA compensation signal VTAH. More specifically, referring to FIG. 8, the second comparator 37 causes the TA compensation signal VTAH to go high when the second offset signal EV2 is higher than the negative peak envelope signal EVZ and causes the TA compensation signal VTAH to go low when the second offset signal EV2 is lower than the negative peak envelope signal EVZ. When the TA compensation signal VTAH is high, thermal asperity is present. In other words, the second offset voltage −V2 is an offset component, which, for example, includes an offset voltage component produced by differences between the devices of the circuit and is set to prevent the generation of an unstable TA compensation signal VTAH when the positive peak envelope signal EVX and the negative peak envelope signal EVZ match.

The signal operational circuit 38 performs a calculation based on the TA detection signal VTA and the TA compensation signal VTAH and generates the control signal VTAC, which corresponds to the TA compensation period. The TA detection signal VTA corresponds to the detection level of thermal asperity, and the TA compensation signal VTAH corresponds to the compensating period of thermal asperity. The signal operational circuit 38 causes the control signal VTAC to go high when the thermal asperity is equal to or higher than a predetermined level and holds the high control signal VTAC until the reproduction signal ST converges to a substantially normal level. More specifically, when the high TA detection signal VTA is provided, the signal operational circuit 38 activates the control signal VTAC in response to the high TA detection signal VTA and deactivates the control signal VTAC in response to the low TA compensation signal VTAH. In other words, referring to FIG. 8, the control signal VTAC generated by the signal operational circuit 38 is high during the period from when the TA detection signal VTA rises to when the TA compensation signal VTAH falls.

The feedback circuit 24 includes an attenuator 41 and a cutoff amplifier 42. The attenuator 41 attenuates the signal SO1X and the inverted signal SO1Z in accordance with the gains of the first amplifier 21 and the cutoff amplifier 42 and respectively generates a signal SO2X and an inverted signal SO2Z. The signals SO2X, SO2Z each have a level optimal for the amplifier 42.

The cutoff amplifier 42 amplifies the difference between the signal SO2X, received at its non-inverting input terminal, and the inverted signal SO2Z, received at its inverting input terminal, and generates the feedback signal RT, the frequency band of which is lower than the cutoff frequency. The cutoff amplifier 42 is selectively switched between the first cutoff frequency fc1 and the second cutoff frequency fc2 in response to the control signal VTAC.

More specifically, the feedback signal RT generated by the cutoff amplifier 42 has a frequency band ranging from DC to the first cutoff frequency fc1 when the control signal VTAC is low and a frequency band ranging from DC to the second cutoff frequency fc2 when the control signal VTAC is high. The second cutoff frequency fc2 is set in accordance with the frequency of the thermal asperity component frequency (approximately 1 Mhz). Accordingly, the cutoff amplifier 42 generates the feedback signal RT including the thermal asperity component when the control signal VTAC is high.

The reproduction amplifier 11 of this embodiment has the advantages described below.

(1) The reproduction amplifier 11 includes the output differential amplifier 21 for comparing the reproduction signal ST and the feedback signal RT and generating the differential amplified signal SI, the detection circuit 23 for detecting the thermal asperity included in the differential amplified signal S1 and generating the control signal VTAC, and the feedback circuit 24 for switching between the first cutoff frequency fc1 and the second cutoff frequency fc2 in response to the control signal VTAC and generating the feedback signal including the thermal asperity component. Thus, the differential amplifier 21 cancels the thermal asperity component included in the reproduction signal ST with the thermal asperity signal included in the feedback signal RT and compensates for the thermal asperity of the reproduction signal ST.

(2) The detection circuit 23 includes the first and second waveform generating circuits 31, 32, which respectively generate the first and second peak envelope signals EVX, EVZ based on the peak of the differential amplified signal S1 of the differential amplifier 21, and the signal generating circuit 35, which compares the first and second peak envelope signals EVX, EVZ during the occurrence of thermal asperity and activates the control signal VTAC. Thus, the control signal VTAC is activated during the occurrence of the thermal asperity and the thermal asperity component is eliminated without being affected by a DC offset.

(3) The detection circuit 23 includes the first and second offset circuits 33, 34, which apply the first and second offset voltages −V1, −V2 to the first peak envelope signal EVX to generate the signals EV1, EV2, respectively. The signal generating circuit 35 compares the signals EV1, EV2 with the second peak envelope signal EVZ to generate the control signal VTAC. Thus, the control signal VTAC is prevented from being generated inaccurately due to differences in the devices of the circuit during the occurrence of thermal asperity.

It should be apparent to those skilled in the art that the present invention may be embodied in many other specific forms without departing from the spirit or scope of the invention. Particularly, it should be understood that the present invention may be embodied in the following forms.

(a) A low-pass filter may be used in lieu of the cutoff amplifier 42. In this case, it is preferred that the cutoff frequency of the low-pass filter be variable. Alternatively, selective switching between a low-pass filter (or amplifier) having the first cutoff frequency fc1 and a low-pass filter (or amplifier) having the second cutoff frequency fc2 may be performed. This also generates the amplified reproduction signal SO in which a thermal asperity component is compensated for.

Figure 9:
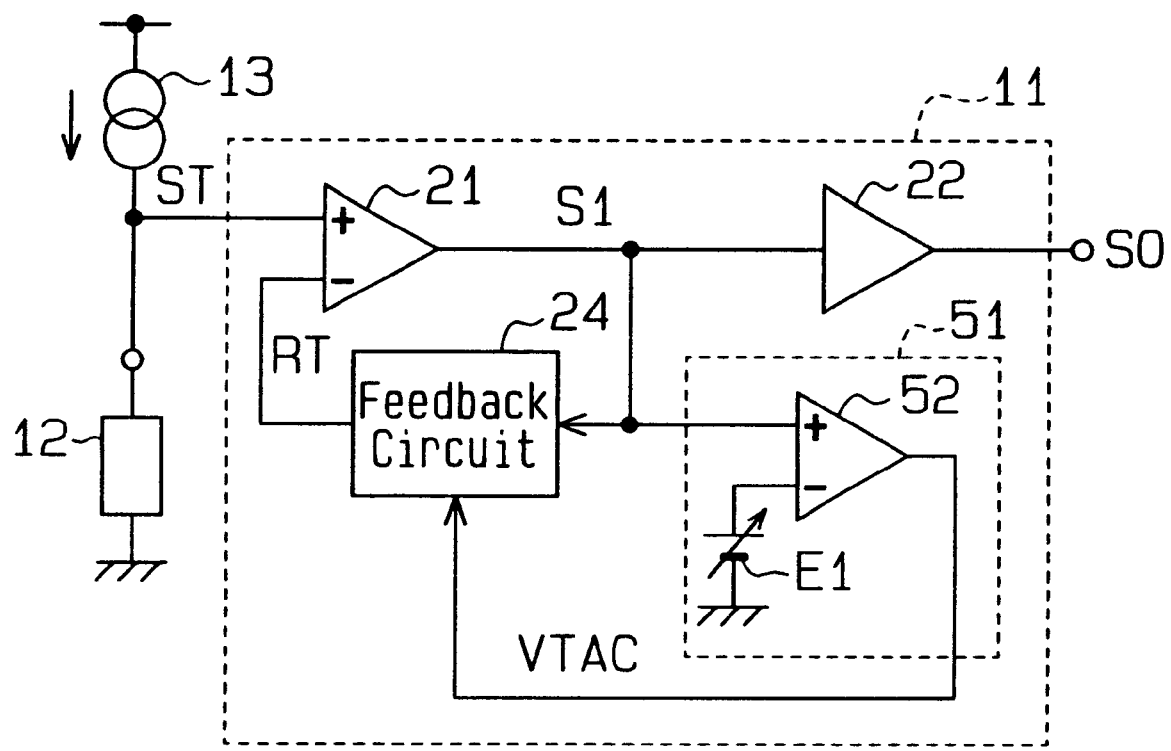
FIG. 9 is a schematic block diagram showing a reproduction amplifier according to a second embodiment of the present invention.

(b) As shown in FIG. 9, a TA detection circuit 51, which includes a comparator 52 and a reference power supply E1, may be used. The comparator 52 has a positive (+) input terminal provided with the signal S1 and a negative (−) input terminal provided with a threshold value voltage Vth from the reference power supply E1. Referring to FIG. 5(a), the threshold value Vth is set at a value between the maximum voltage of the reproduction signal ST and the maximum voltage of the thermal asperity component (e.g., one half of the maximum voltage of the thermal asperity component). The comparator 52 compares the voltage of the signal S1 with the threshold voltage Vth and causes the control signal VTAC to go low when the voltage of the signal S1 is lower than the threshold voltage Vth and causes the control signal VTAC to go high when the voltage of the signal S1 is higher than the threshold voltage Vth. In this manner, the TA detection circuit 51 generates the high control signal in accordance with the thermal asperity component included in the signal S1.

(c) Thermal asperity may be detected in the following manner. Differential potentials between a median potential ((VSO1X+VSO1Z)/2) of a differential amplified signal of the first amplifier 21 and the signals SO1X, SO1Z are obtained. VSO1X represents the voltage of the signal SO1X, and VSO1Z represents the voltage of the signal SO1Z. Then, a DC potential is obtained by eliminating a signal component including a thermal asperity waveform from the differential amplified signal with a low-pass filter having a sufficiently low cutoff frequency. That is, the DC offset component of each of the signals SO1X, SO1Z is obtained from the median potential. The offset components are then eliminated from the original signals SO1X, SO1Z to generate the peak envelope signals EVX, EVZ. The TA detection signal VTA, the compensation signal VTAH, and the control signal VTAC are obtained afterward.

The present examples and embodiments are to be considered as illustrative and not restrictive, and the invention is not to be limited to the details given herein, but may be modified within the scope and equivalence of the appended claims.

What is claimed is:

1. A noise eliminating circuit for eliminating noise from an input signal, the noise eliminating circuit comprising:
 a differential amplifier for receiving the input signal and a feedback signal and generating a differential amplified signal;
 a detection circuit connected to the differential amplifier for detecting noise included in the differential amplified signal and generating a control signal, wherein the control signal is activated when the noise is detected; and
 a feedback circuit connected to the differential amplifier and the detection circuit for for providing said feedback signal to cut off the differential amplified signal in accordance with a first cutoff frequency when the control signal is deactivated, and cutting off the differential amplified signal in accordance with a second cutoff frequency, which includes the frequency of the noise, when the control signal is activated.

2. The noise eliminating circuit according to claim 1, wherein the first cutoff frequency is lower than a low range frequency of a frequency band of the input signal.

3. The noise eliminating circuit according to claim 1, wherein the detection circuit includes:
 first and second peak envelope generating circuits for respectively generating first and second peak envelope signals based on a peak of the differential amplified signal; and
 a control signal generating circuit for comparing the first and second peak envelope signals and generating the control signal.

4. The noise eliminating circuit according to claim 3, wherein the first peak envelope signal is a positive peak envelope signal of the differential amplified signal and the second peak envelope signal is a negative peak envelope signal, which is the inverted positive peak envelope signal.

5. The noise eliminating circuit according to claim 3, wherein the control signal generating circuit compares the first and second peak envelope signals to detect the occurrence of noise and activates the control signal when noise is detected.

6. The noise eliminating circuit according to claim 3, wherein the detection circuit includes first and second offset circuits connected to the first peak envelope generating circuit for respectively offsetting the first peak envelope signal in accordance with first and second offset amounts to generate first and second offset peak envelope signals, and wherein the control signal generating circuit compares the first and second offset peak envelope signals with the second peak envelope signal to generate the control signal.

7. The noise eliminating circuit according to claim 6, wherein the control signal generating circuit includes:
 a first comparator connected to the first offset circuit and the second peak envelope generating circuit for comparing the first offset peak envelope signal and the second peak envelope signal to generate a noise detection signal;
 a second comparator connected to the second offset circuit and the second peak envelope generating circuit for comparing the second offset peak envelope signal and the second peak envelope signal to generate a noise compensation signal; and a signal operational circuit connected to the first and second comparators and the feedback circuit for generating the control signal using the noise detection signal and the noise compensation signal.

8. The noise eliminating circuit according to claim 1, wherein the detection circuit generates a positive peak envelope signal and a negative peak envelope signal from the differential amplified signal and compares the positive and negative peak envelope signals to generate the control signal.

9. The noise eliminating circuit according to claim 8, wherein the positive peak envelope signal is generated by excluding a first DC offset component, which is a differential potential between a median potential of the differential amplified signal and the differential amplified signal, from the differential amplified signal, and the negative peak envelope signal is generated by excluding a second DC offset component, which is the differential potential between the median potential of the differential amplified signal and the inverted differential amplified signal, from the inverted differential amplified signal.

10. The noise eliminating circuit according to claim 1, wherein the feedback circuit includes a differential amplifier for receiving the differential amplified signal from the differential amplifier and restricting a frequency band of the differential amplified signal in accordance with one of the first and second cutoff frequencies based on the control signal to generate the feedback signal.

11. The noise eliminating circuit according to claim 1, wherein the feedback circuit includes a low-pass filter for receiving the differential amplified signal from the differential amplifier and restricting a frequency band of the differential amplified signal in accordance with one of the first and second cutoff frequencies based on the control signal to generate the feedback signal.

12. An amplification circuit for amplifying a reproduction signal read from a magnetic recording medium using a magneto resistive head, the amplification circuit comprising:
a differential amplifier for receiving the reproduction signal and a feedback signal and generating a differential amplified signal;
a detection circuit connected to the differential amplifier for detecting thermal asperity noise included in the differential amplified signal and generating a control signal, wherein the control signal is activated when the noise is detected; and
a feedback circuit connected to the differential amplifier and the detection circuit for for providing said feedback signal to cut off the differential amplified signal in accordance with a first cutoff frequency when the control signal is deactivated, and cutting off the differential amplified signal in accordance with a second cutoff frequency, which includes the frequency of the thermal asperity noise, when the control signal is activated.

13. A magnetic recording device comprising,
a magneto resistive head for generating a reproduction signal in accordance with polarity changes of a magnetic recording medium, and
an amplification circuit connected to the magneto resistive head for amplifying the reproduction signal, wherein the amplification circuit includes:
a differential amplifier for receiving the reproduction signal and a feedback signal and generating a differential amplified signal;
a detection circuit connected to the differential amplifier for detecting thermal asperity noise included in the differential amplified signal and generating a control signal, wherein the control signal is activated when the noise is detected; and
a feedback circuit connected to the differential amplifier and the detection circuit for for providing said feedback signal to cut off the differential amplified signal in accordance with a first cutoff frequency when the control signal is deactivated, and cutting off the differential amplified signal in accordance with a second cutoff frequency, which includes the frequency of the thermal asperity noise, when the control signal is activated.

* * * * *